Oct. 4, 1938.    J. D. NIXON    2,132,081
MEANS FOR THE FLOWING OF WELLS
Original Filed May 4, 1936    8 Sheets-Sheet 1

INVENTOR.
Jeddy D. Nixon
BY
ATTORNEY.

Oct. 4, 1938.   J. D. NIXON   2,132,081
MEANS FOR THE FLOWING OF WELLS
Original Filed May 4, 1936   8 Sheets-Sheet 3

INVENTOR.
Jeddy D. Nixon
BY
ATTORNEY.

Oct. 4, 1938.   J. D. NIXON   2,132,081
MEANS FOR THE FLOWING OF WELLS
Original Filed May 4, 1936   8 Sheets-Sheet 4

INVENTOR.
Jeddy D. Nixon
BY Jack A. Ashley
ATTORNEY.

Oct. 4, 1938.    J. D. NIXON    2,132,081
MEANS FOR THE FLOWING OF WELLS
Original Filed May 4, 1936    8 Sheets—Sheet 5

INVENTOR.
Jeddy D. Nixon
BY Jack Ashley
ATTORNEY.

Oct. 4, 1938.   J. D. NIXON   2,132,081
MEANS FOR THE FLOWING OF WELLS
Original Filed May 4, 1936   8 Sheets-Sheet 6

INVENTOR.
Jeddy D. Nixon
BY Jack Ashley
ATTORNEY.

Oct. 4, 1938.  J. D. NIXON  2,132,081
MEANS FOR THE FLOWING OF WELLS
Original Filed May 4, 1936   8 Sheets—Sheet 7

INVENTOR.
Jeddy D. Nixon
BY
ATTORNEY.

Patented Oct. 4, 1938

2,132,081

UNITED STATES PATENT OFFICE 2,132,081

MEANS FOR THE FLOWING OF WELLS

Jeddy D. Nixon, Houston, Tex., assignor of one-half to Wilson Supply Company, Houston, Tex., a corporation of Texas Substitute for abandoned application Serial No. 79,641, May 4, 1936. This application February 1, 1937, Serial No. 123,444

REISSUED

20 Claims. (Cl. 103—233)

This invention relates to new and useful improvements in methods of and means for the flowing of wells.

One object of the invention is to provide improved means for utilizing and controlling gas, air, or other pressure fluid for flowing a well, which may be supplied by the well or from an outside source.

Another object of the invention is to provide improved means for flowing a well which utilizes the gas therefrom to lift the liquid from the well, whereby the liquid is raised expeditiously and economically.

An important object of the invention is to provide means for conserving the gas from a well or wells, so that said gas may be used in a system and recirculated or rotated, whereby an all-enclosed system is provided for said gas.

Another object of the invention is to provide an improved method of flowing wells which consists in, packing off the well tubing to prevent upward flow through the well casing, introducing fluid under pressure into the tubing successively at various points below the standing liquid level therein, introducing said fluid into the tubing at a single point below the above introduction points, and controlling from the surface of the well the flow of well fluid through the tubing at a point below the single point of introduction of the pressure fluid.

Still another object of the invention is to provide means for introducing gas or air under pressure into a well tubing at a single point below the standing liquid level therein, whereby the liquid is lifted only the distance from the point where the natural flow stops to the surface, thereby requiring less auxiliary pressure than is necessary to raise the liquid column the full length of the tubing, as is the usual practice; thus resulting in a great saving in operating costs, as well as making for more efficient operation.

A further object of the invention is to provide an improved method of flowing wells which consists in, packing off the well tubing to prevent upward flow through the well casing, introducing fluid under pressure into the tubing at a single point below the standing liquid level therein, and controlling from the surface of the well the flow of well fluid through the tubing at a point below the point of introduction of the pressure fluid.

Still another object of the invention is to provide means for introducing fluid under pressure to the casing of a well below the standing level of liquid in said casing, and means located below said pressure fluid inlet for controlling the flow of liquid through the tubing of said well, said means being operable from the surface of the well, whereby the natural flow through said tubing may be cut off at any desired time to permit an increased fluid pressure to build up within said casing.

A particular object of the invention is to provide an improved flow control unit including means for introducing gas under pressure into the well tubing below the liquid level therein, together with means for retaining the gas pressure within the well when the gas supply is cut off and production ceases, whereby the retained pressure will immediately flow the well when the gas is again supplied upon the next operation of the invention, which eliminates the necessity of building up the pressure prior to each operation of the unit.

Another object of the invention is to provide means operable from the surface of the well for admitting a gas pressure from the casing to the tubing, whereby the liquid may be raised in the tubing and expelled therefrom.

Still another object of the invention is to provide an intermittent flowing control means for admitting a gas pressure in the casing into the tubing, said means being opened by the pressure of the liquid column in said tubing above said means and closed by the gas pressure in said casing passing through said means, whereby the liquid is intermittently lifted out of said tubing, as it is produced.

A further object of the invention is to provide hoisting means operable by the gas pressure for actuating some of the various controls of the well, said means being so constructed that the exhaust therefrom is discharged into the flow line of the well, whereby the gas is returned to the system and recirculated.

Another object of the invention is to provide packing means attached to the tubing and inserted into the casing of a well so as to pack off the space between the tubing and the casing, whereby upward and downward flow therebetween is prevented.

Still another object of the invention is to provide an improved method of flowing wells which conserves the gas expelled from the separator and the same being repressured for lifting the fluid in the well. The surplus gas is led off to another system, or to storage facilities.

A construction designed to carry out the invention will be hereinafter described, together with other features of the invention.

The invention will be more readily understood from a reading of the following specification and by reference to the accompanying drawings, in which an example of the invention is shown, and wherein:

Figure 24 is a detail view showing packer ready to be lowered into the casing.

Figure 1:
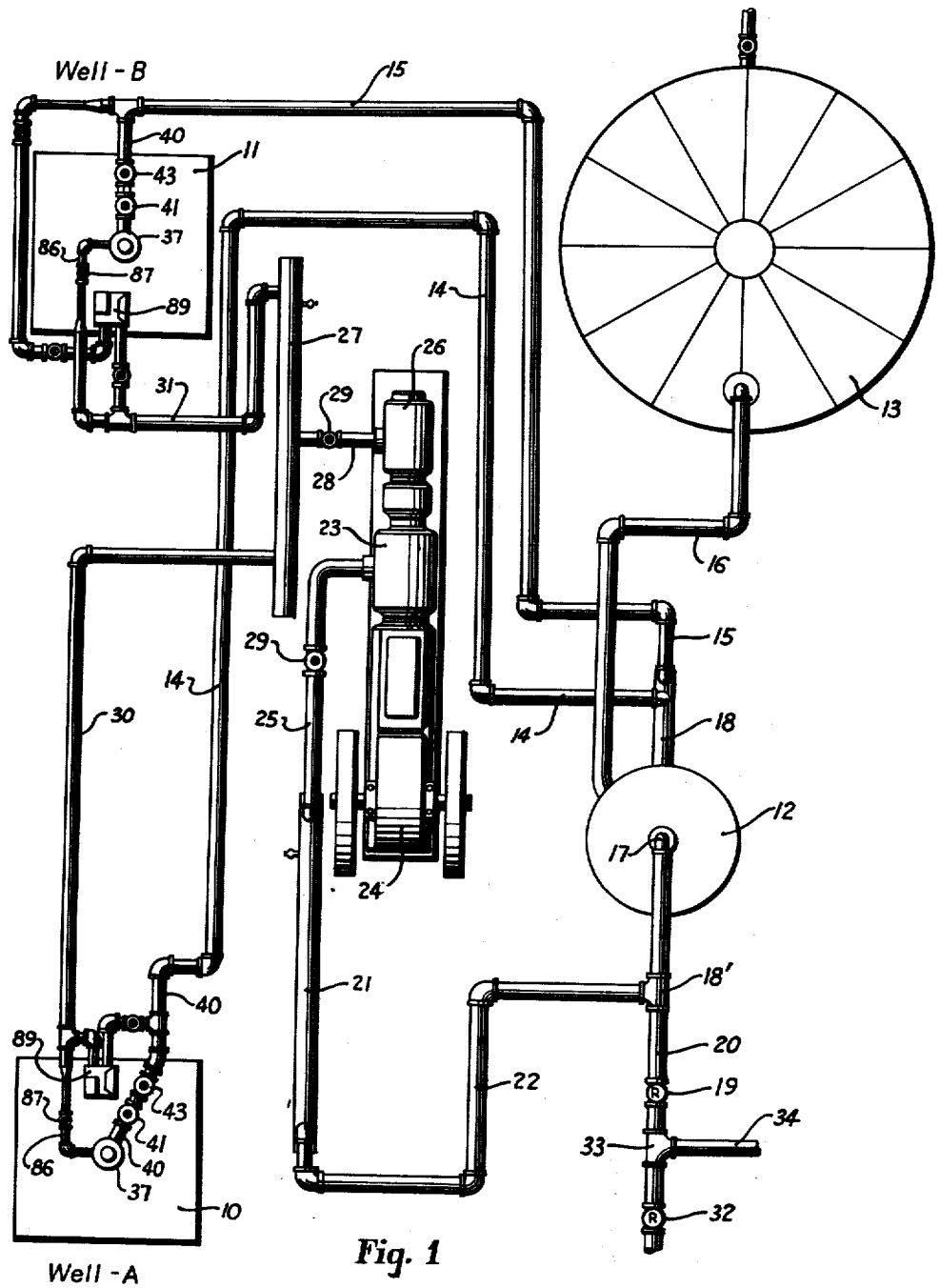
Figure 1 is a diagrammatic plan view of a typical installation constructed in accordance with the invention.

In the drawings, the numeral 10 designates the derrick floor of a well A and 11 the derrick floor of a well B. The wells A and B are connected to a horizontally extending manifold 18 (Figure 1) in the usual manner by pipes 14 and 15. The manifold is connected to a suitable separator 12, which is connected by pipes 16 to the usual stock tanks 13 (only one being shown in the drawings, Figure 1).

The regular gas outlet pipe 17 of the separator is connected to a T 18', one outlet of which is connected to a suitable regulator 19 by a pipe 20. This regulator is set to hold a designated back pressure on the separator, in order to facilitate the operation thereof. Another regulator 32, similar to the regulator 19, is connected thereto by a T 33 and a field line 34 extending from the T 33, may lead to another installation, storage facilities, or for any desired use. The outlet of the regulator 32 may be connected, as desired, to a suitable standpipe, torch or the like. The regulator 32 is provided for holding a desired pressure in the field line 34. It is pointed out that it is not essential to the invention that the inlet of the regulator 32 be connected to a field line as shown, because it may be connected to a torch or the like.

The T 18 is also connected to one end of a horizontally extending scrubber 21 by a pipe 22. A suitable compressor 24 has a low compression cylinder 23, which is connected to the opposite end of the scrubber 21 by a pipe 25, and also a high compression cylinder 26. The cylinders are so designed that the low compression cylinder 23 may receive the fluid from the separator at the same pressure as the back pressure, which is held on the separator by the regulator 19, (usually 40 pounds). On the usual type of compressor, the low compression cylinder will only handle the fluid at atmospheric pressure and this means that the pressure of the fluid would first have to be reduced to atmospheric pressure and then drawn into said cylinder and compressed. Thus, the higher pressure drawn into cylinder 23 of the compressor 24 will not require as much energy to be compressed to the desired pressure as atmospheric pressure. The outlet of the high compression cylinder 26 is connected to a laterally extending manifold 27 by pipe 28 and the pipes 25 and 28 are provided with hand valves 29, so that the compressor 24 may be disconnected or removed for repairs or replacements. The manifold 27 is connected to well A by pipes 30 and to well B by pipes 31.

Figure 2:
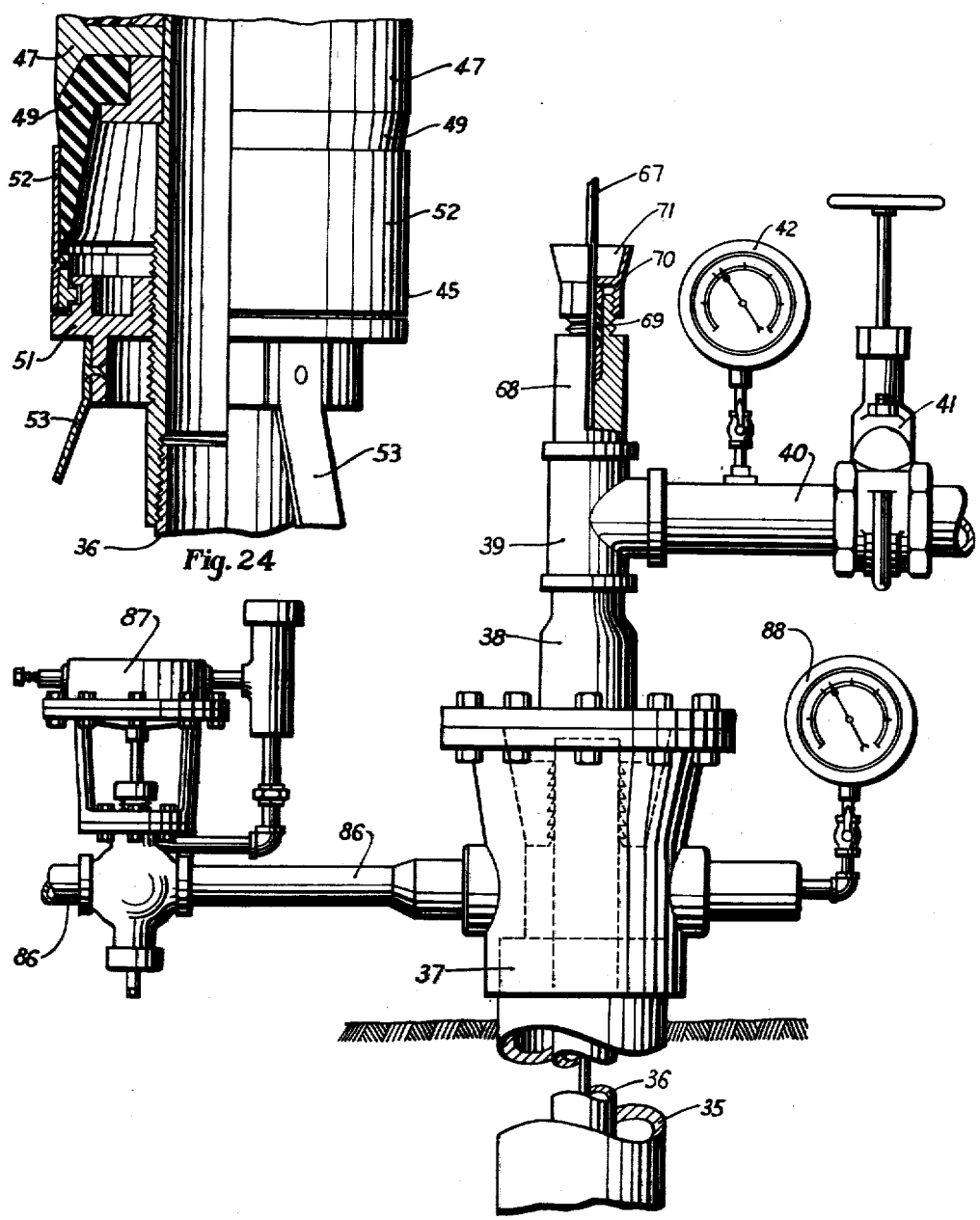
Figure 2 is an enlarged view, partly in section and partly in elevation, of the upper portion of the well unit.
Figure 3:
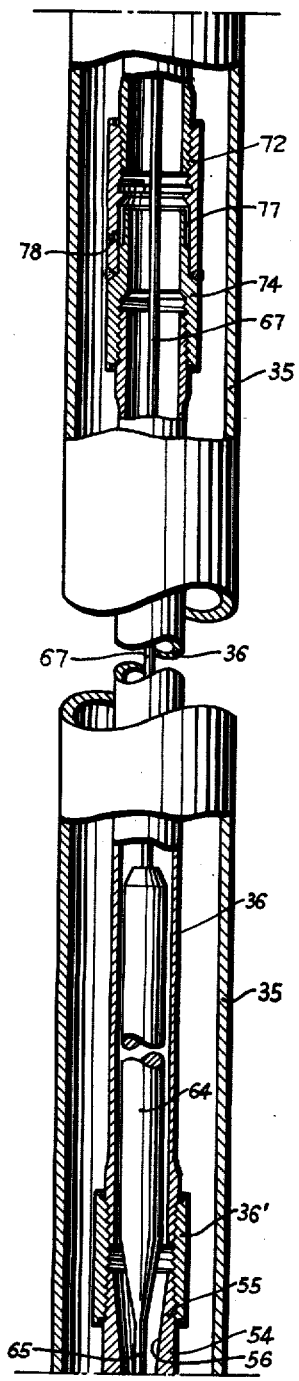
Figures 3, 4 and 5 are views, partly in elevation and partly in section, showing successive portions of the equipment extending down into the well.
Figure 4:
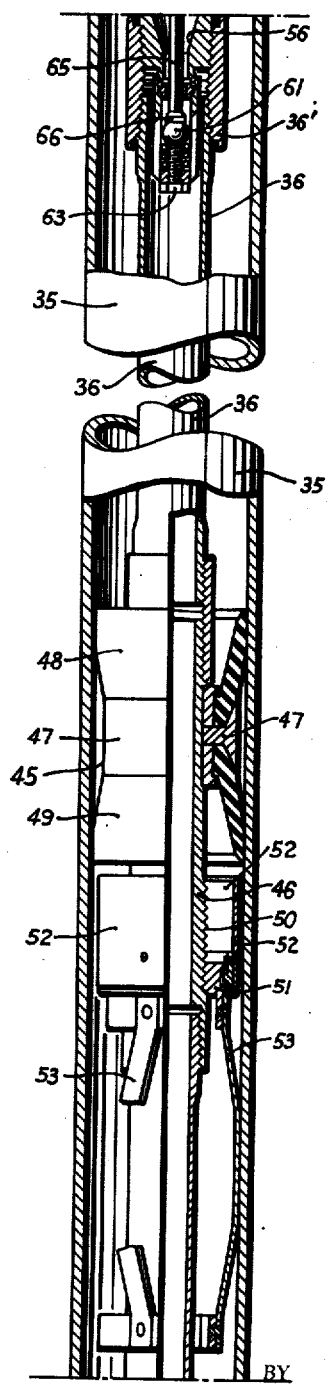

As the hook-up for each well is somewhat similar, a description of one will suffice for both. The regular well casing 35 (Figures 2 to 6) has the well tubing string 36 depending therethrough. The upper end of the casing is screwed into the usual casing head 37 (Figure 2) mounted above the ground level and the upper end of the tubing is supported within the casing head in the usual manner. The regular swage nipple 38 extends upwardly from the casing head and connects with the lower end of a T connection 39. A horizontal pipe 40 for carrying the liquid from the tubing has one end screwed into the T 39, and the other end is connected to the pipe 14 (Figure 1). A suitable, manually operated gate valve 41 is connected in the pipe 40, whereby the flow through said pipe may be closed. It is obvious that fluid flowing upwardly through the tubing 36 will flow through the nipple 38, T 39 and pipe 40, and through the pipe 14. A suitable pressure gauge 42 is connected in the pipe 40 between the T and the gate valve, (Figure 2). If desired, a check valve 43 (Figure 1) may be inserted in the pipe 40 between the valve 41 and the pipe 14.

Figure 5:
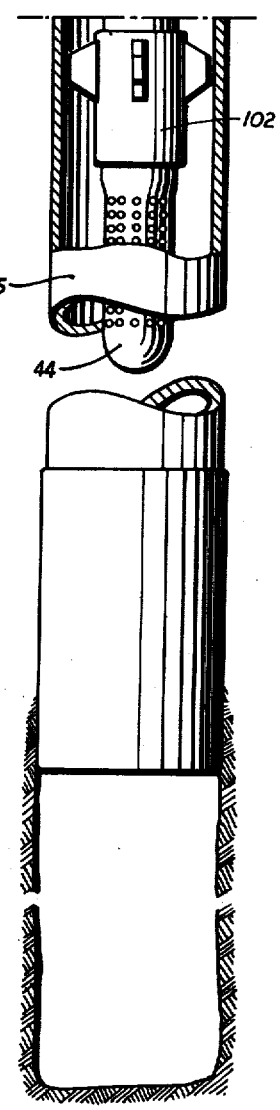
Figure 6:
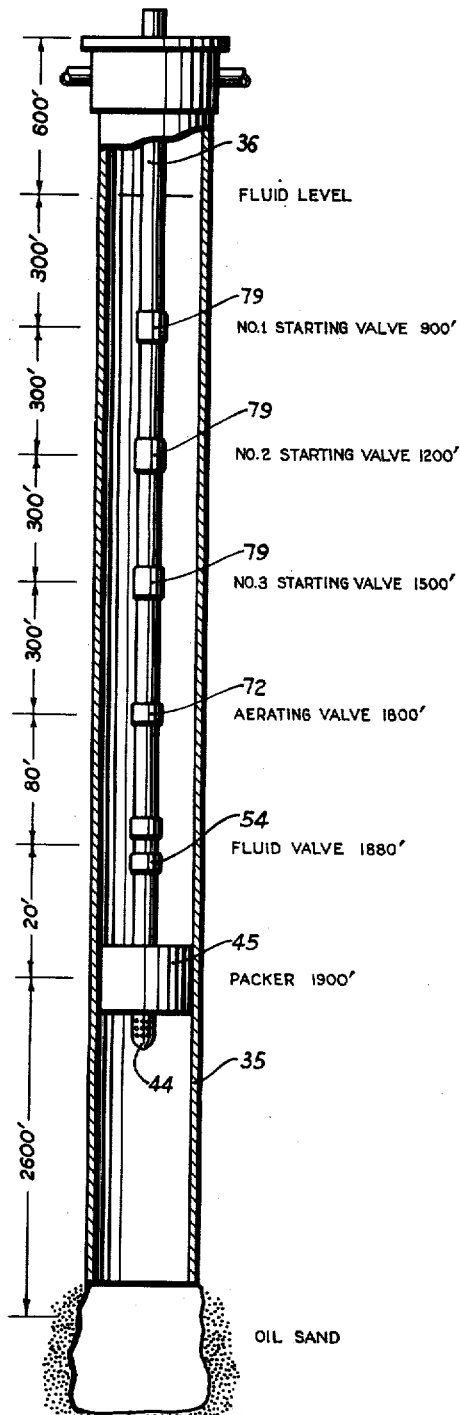
Figure 6 is a diagrammatic view of the entire well unit positioned in a well casing.

The tubing string extends practically the full length of the casing 35 and its lower end may depend to within a short distance of the bottom of the well or it may be spaced at some distance therefrom (Figures 5 and 6). The lower end of said tubing is provided with the usual screen or perforated bull plug 44. A suitable flow packer 45 (Figures 4, 6, 19 and 24) is connected in the tubing string near the lower end thereof and when set, this packer engages the inner wall of the casing 35 to prevent upward and downward flow through the space between said casing and the tubing, whereby the fluid from the bottom of the hole is caused to flow upwardly through said tubing. Although any suitable packer may be used, it is preferable to employ the packer disclosed in the drawings.

This packer, clearly shown in Figures 4, 6, 19 and 24, includes an upright, tubular mandrel 46, provided at each end with screw threads, whereby it may be readily connected in the tubing string. The upper portion of the mandrel is reduced and carries a double, integral thimble 47, having lips extending upwardly and downwardly, and oppositely flared, elastic packing collars 48 and 49 have their inner edges secured in the thimble, whereby their outer ends or lips are left free to contact and pack off the space between the casing and the tubing. The lower portion of the mandrel is provided with coarse, left-handed screw threads 50, and a collar 51 is threaded thereon. The collar has a vertically extending sleeve 52 rotatably confined on its outer periphery.

Figure 13:
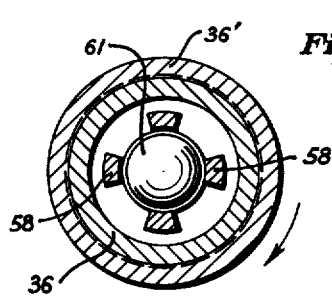
Figure 13 is a horizontal cross-sectional view, taken on the line 13—13 of Figure 9.

In introducing the packer 45 into the well, the collar 51 and sleeve 52 are screwed upwardly on the mandrel 46. The packing collar 49 is gathered inwardly (Figure 24) within the sleeve and it is obvious that during the lowering operation, said sleeve will prevent the packing collar from engaging the wall of the casing 35. When it is desired to set the packer, which is usually at the producing level of the well, the friction gripping springs 53 engaging the casing hold the collar 51 stationary. The tubing 35 and mandrel 46 are rotated in a clockwise direction (Figure 13) and, since the threads 50 on the mandrel are left-handed, while all the other tubing connections are right-handed, it is obvious that the collar 51 and sleeve 52 will travel downwardly on the mandrel. This lowering of the sleeve 52 releases the packing collar 49, so as to permit the same to expand outwardly and to engage the casing 35. With the packer in this position, it is obvious that upward and/or downward flow through the casing is positively prevented. Due to the flare of the packing collars 48 and 49, it is pointed out that the pressure fluid above the collar 48 will be prevented from passing below said packer; while the pressure fluid below the collar 49 is prevented from flowing upward between the tubing and the casing.

Above the packer 45, a fluid control valve 54 (Figures 3, 4, 6 and 9) is mounted in the tubing string and this valve controls the flow of the fluid through the tubing. The valve includes a nipple 55, having its upper and lower ends screw threaded, to screw into coupling sleeves 36' of the tubing string, whereby said sleeves connect said nipple with the tubing. The nipple is provided with a tapered bore 56 which is reduced toward its lower end. A reduced collar 57 surrounds the lower end of the bore and depends axially from the nipple. The reduced collar 57 has a depending skirt 57' and both the skirt and the collar are externally screw threaded to receive the upper end of the valve cage 58. Immediately below the upper screw threads of the cage 58 an internal shoulder 59 is provided and, by observing Figure 9, it will be seen that a valve seat 60 is clamped within the upper end of said cage between the shoulder 59 and the lower end of the skirt 57'.

A valve ball 61 is confined within the cage 58 and is held in constant engagement with the seat 60 by a coil spring 62, which is located within the cage between the lower end thereof and the underside of the ball. An axially extending bolt 63 is threaded through the lower end of the cage and extends a short distance upwardly through the spring, serving as a guide therefor, and as a stop for the downward movement of the ball 61. From the above it will be seen that normally the spring 62 holds the valve ball closed to prevent upward flow of the well fluid through the tubing. It is pointed out that the fluid valve may be located at any specified distance below the normally extending liquid level of the well, as shown in Figure 6.

For opening the valve by unseating the ball 61, an elongated, cylindrical weight 64 is movable vertically within the tubing above said ball. The weight is provided with a depending plunger 65 having a head 66 on its lower end. When the weight is lowered, the head 66 of the plunger 65 engages the ball and forces it downwardly under tension of the spring 62, thereby unseating said ball and opening the lower end of the tubing to permit upward flow of fluid therethrough. The weight is suspended from the lower end of a cable or wire line 67, which extends upwardly through the tubing 36 and through the casing head 37 at the surface of the well. A vertically extending stuffing-box support 68 is mounted on the upper end of the T 39, and has the usual stuffing-box 69 at its upper end. The cable 67 extends through said support and stuffing-box and to a suitable drum or hoist. The stuffing-box cap or nut 70 has an upright, marginal flange 71 on its upper end, which forms an oil chamber or reservoir, so that said wire line or cable 67 passing therethrough will be coated with a film of oil which prevents excessive wear on the stuffing-box 69 and stuffing-box support 68, as well as the cable.

Figure 7:
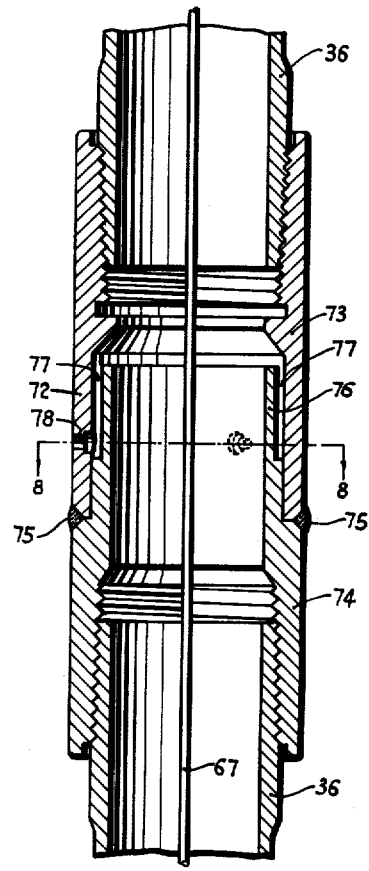
Figure 7 is an enlarged, transverse vertical sectional view of one form of aerating valve.
Figure 8:
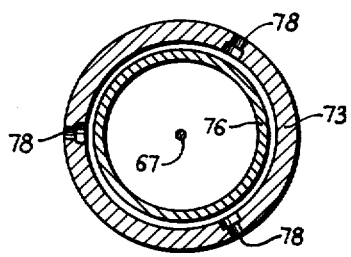
Figure 8 is a horizontal cross-sectional view, taken on the line 8—8 of Figure 7.

At a point above the fluid control valve 54, an elongated sleeve or aerating valve 72 (Figures 3, 6 and 7) is connected in the tubing. This valve is made in two sections, 73 and 74, which are welded together at 75. The lower section 74 has an upstanding off-set collar 76, which extends within the interior of the upper sections 73. The upper portion of the collar 76 is externally reduced so as to provide an annular space 77 between this upper portion and the inner wall of the upper section 73. The lower portion of the upper section 73 of said valve is provided with a plurality of preferably small radial ports 78 which extend therethrough. These ports are in horizontal alignment with the reduced upper end of the collar 76, whereby a communication is established between the interior of the casing and the interior of the tubing through the ports 78 and annular space 77. Thus, when gas, air, or other pressure, is introduced into the upper end of the casing, this gas will pass from the casing into the tubing, thereby forcing any fluid in said tubing above the valve 72 to the surface. It is pointed out that valve 72 admits only a small quantity of pressure fluid into the tubing, so that said pressure fluid is not wasted.

Figure 14:
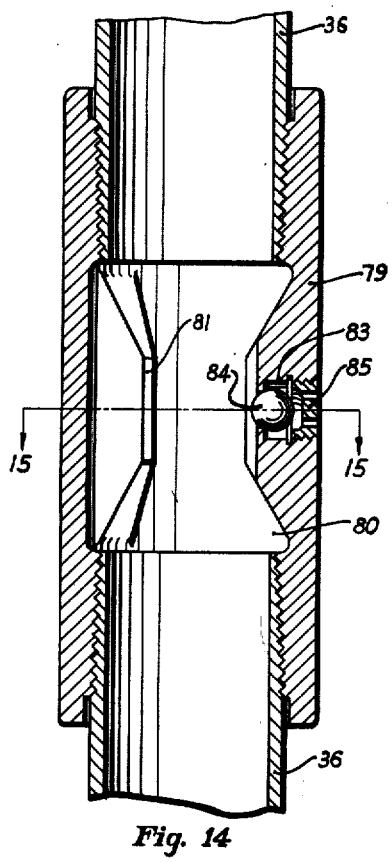
Figure 14 is an enlarged, transverse vertical view of one of the starting valves.
Figure 16:
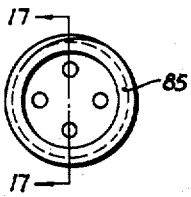
Figure 16 is an elevation of a retainer plug for the port of the starting valve.
Figure 17:
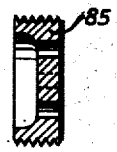
Figure 17 is a transverse vertical sectional view, taken on the line 17—17 of Figure 16.
Figure 15:
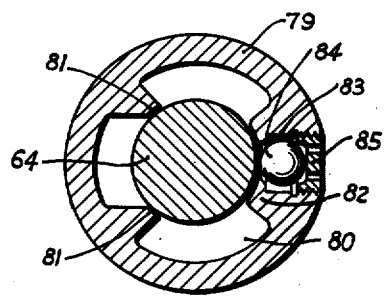
Figure 15 is a horizontal cross-sectional view, taken on the line 15—15 of Figure 14.
Figure 19:
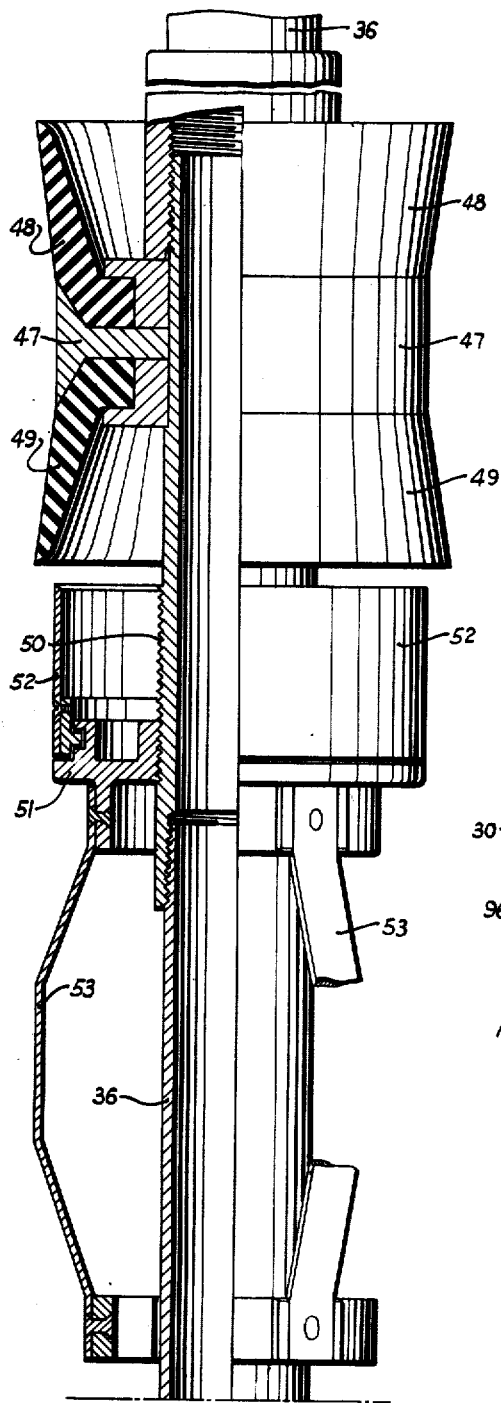
Figure 19 is an enlarged detail view of the packer, partly in section and partly in elevation.
Figure 20:
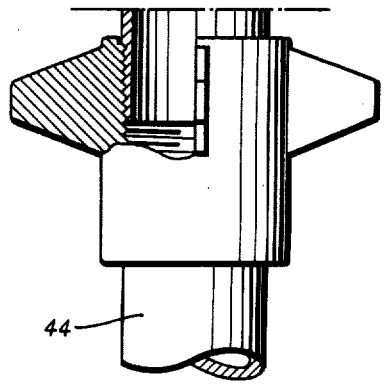
Figure 20 is a similar view of the lower portion of the packer.
Figure 21:
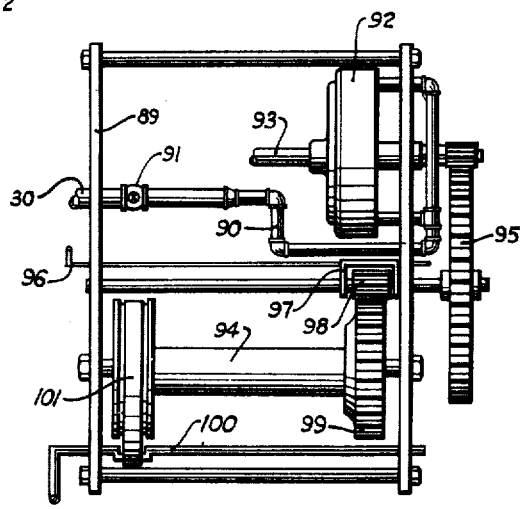
Figure 21 is a plan view of the hoist.

Above the aerating valve 72, an elongated collar forming a valve 79 (Figures 6 and 14) is connected to the tubing string. An internal, annular chamber 80 is formed in the valve and has a number of inwardly directed, guide ribs 81 extending thereinto and also, an inwardly directed boss 82. A radial port 83 extends through the boss and the wall of the valve, and provides communication between the casing and the tubing when the port is open, so that pressure fluid may enter the tubing from the casing, whereby any oil in the tubing above the port 83 is raised and carried out of said tubing. The port is provided at its inner end with a seat, and a valve ball 84 engages said seat for closing the port. The outer end of said port is internally screw threaded, so as to receive a perforated retaining ring 85. Thus, it will be seen that a cage is formed for said ball 84 and it will be noticed in Figures 14 and 15, that when the weight 64 passes through said valve, the guide ribs 81 will force said weight into contact with the concaved innerface of the boss 82, whereby said weight will engage the ball 84 and force the same from its seat. In this position, liquid and pressure fluid will flow into the tubing until the port is closed. When the weight has passed through the collar 79, the suction of the pressure fluid flowing through the open port will draw the ball onto its seat and thus close the port.

In Figure 6 a typical installation is shown in which three starting valves 79 are mounted in the tubing string 36. However, it is pointed out that the number of starting valves used depends on each individual installation and may be as many as necessary. The spacing of the starting valves 79, the aerating valve 72, the fluid valve 54 and the packer 45 all depend on each individual installation and varies accordingly. It will be seen that the invention is very flexible and can be adjusted to suit any condition encountered in which the invention is to be installed. The various elements to be taken into consideration include the size of the tubing being used; the size of the casing in the well; the liquid level in the well, that is, the level at which the liquid normally stands in the casing; the bottom hole pressure, the pressure of the gas in the oil sand at the bottom of the well; and the amount of oil that is desired to be removed from the well each day.

For introducing gas, air, or other pressure fluid into the casing 35, a supply line 86 (Figure 2) has one end connected to the pipe 30 (Figure 1) for receiving the compressed pressure fluid from the compressor 24 and its other end connected in one side of the casing-head 37. A suitable pressure regulator 87 is preferably connected in this line and a manually operated control valve (not shown) similar to the control valve 41 may be connected in this line, if desired. A suitable pressure gauge 88 is connected in the opposite side of the casing-head from the supply line 86 (Figure 2). It is obvious that compressed gas or air supplied to the line 86 will be directed into the casing 35 of the well and to be utilized to raise the liquid from the well. The regulator 87 maintains the required operating pressure in the casing and prevents any fluctuation in the pressure maintained in said casing and also said pressure being increased.

The wire line or cable 67 may be operated by any suitable means. A small auxiliary hoist 89 has been provided, which is operated from the pressure fluid in the pipe 30 and is connected to said pipe by the intake pipe 90 in which is provided a manually operated control valve 91. The pipe 90 leads to the intakes of a fluid actuated turbine 92, which has its exhaust 93 connected into the return or flow line 40. It is pointed out that the gas is circulated and conserved so as to be used repeatedly. The turbine drives a drum 94 through a suitable gear train 95 or other speed reducing means, and the cable 67 is wound on said drum. A slidable rod 96 is connected to a sliding clutch arrangement 97, which will move the pinion 98 into and out of engagement with the gear 99 on the drum 94. A suitable braking pitman 100 having a brake band 101 attached thereto, works on the drum so as to form an effective brake therefor.

In operation, the fluid level of the well is ascertained and the apparatus installed in the tubing string 36 (Figure 6), in accordance with the conditions found in the installation under discussion. The bull plug 44 or a screen of the desired length is screwed into the lower end of the guide collar 102 (Figure 5) of packer 45. The collar 51 and sleeve 52 (Figure 24) are screwed upwardly on the mandrel 46 and the lower packing collar 49 is gathered inwardly within said sleeve, so that the lips of the packing collar will not engage the wall of the casing when the same is lowered into the well. The tubing 36 is connected with the top of the packer (Figure 19); and the fluid control valve 54, the aerating valve 72 and the starting valves 79 (Figures 3, 4, 6, 7 and 9) are each connected in the tubing as hereinbefore described, the number of starting valves being controlled by the well requirements.

The assembly is lowered into the well, until the packer is at the depth at which it is desired to set the same, preferably at the producing level of the well. The tubing string 36 and mandrel 46 are rotated in a clockwise direction (Figure 13) and due to the left-hand threads on the mandrel (Figures 4, 19 and 24) and the friction guides 53 engaging the casing, the collar 51 and sleeve 52 will travel downwardly on the mandrel, whereby the packing collar 49 is released from within the sleeve 52 and expands outwardly to engage the wall of the casing 35. The upper packing collar 48 being already in contact with said casing wall (Figures 4 and 24), it is obvious that an upward or downward flow through the casing is prevented. As will be seen in Figure 6, the packer is set at some distance below the standing liquid level of the well.

The weight 64 suspended from the cable 67 is inserted within the tubing, the stuffing-box support 68, stuffing-box packing 69 and cap 70 are mounted on the T connection 39 and the marginal flange 71 filled with oil. The gas or fluid pressure is then introduced into the casing 35 and the weight 64 is lowered down into the No. 1 starting valve 79, (Figure 6). As the gas pressure is built up in the casing 35, the pressure will be exerted upon the fluid level, so that the same is lowered by reason of the fluid being forced into the tubing 36 through the port 83 of the valve 79. As the pressure continues building up, the fluid level in the casing is lowered until the fluid level is below the port 83, at which time the gas will enter said port and lift the fluid in the tubing up and out thereof. Thus, the operator knows that the fluid level is below the port 83 and then the weight 64 is lowered out of the No. 1 starting valve 79. The pressure of the gas passing through the port 83 will draw the valve ball 84 into its seat and thus close the port.

Figure 9:
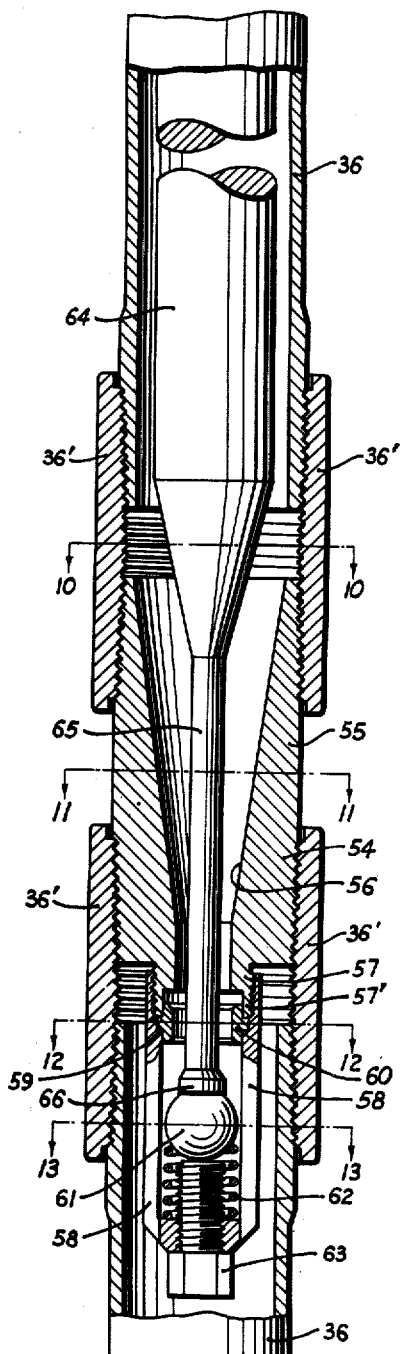
Figure 9 is an enlarged, transverse vertical sectional view of the liquid valve which is disposed in the tubing.
Figure 10:
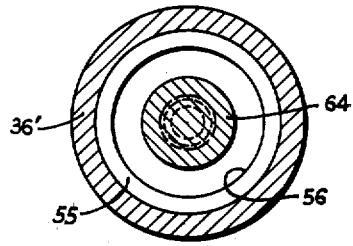
Figure 10 is a horizontal cross-sectional view, taken on the line 10—10 of Figure 9.
Figure 11:
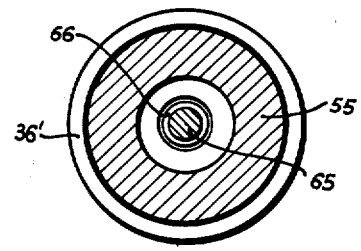
Figure 11 is a horizontal cross-sectional view, taken on the line 11—11 of Figure 9.
Figure 12:
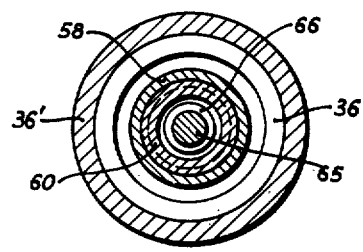
Figure 12 is a horizontal cross-sectional view, taken on the line 12—12 of Figure 9.

The lowering of the weight is continued until the No. 2 starting valve 79 is opened and the same operation is repeated until this valve is "kicked off", that is, the fluid in the casing being forced into the tubing and being raised and expelled. The No. 3 starting valve 79 is "kicked off" in the same manner, and the weight is lowered to a position below said No. 3 starting valve but above the aerating valve. As the ports in the aerating valve 72 (Figure 7) are always open, it does not require the weight 64 to open them or to "kick off". However, this valve "kicks off" in the same manner as the other valves and as soon as it does start flowing, the weight is lowered until the head 66 on the lower end of the plunger 65, which depends from the bottom of the weight, engages the ball 61 of the fluid valve 54 (Figure 9). The fluid below the packer 45 from the oil sand is now free to enter the perforations of the bull plug 44 and to flow upwardly through the fluid valve 54 into the tubing. As the bottom hole pressure of the well is sufficient to carry the fluid up to the standing fluid level, it will be seen that the fluid will be carried up past the aerating valve 72. The gas pressure entering said aerating valve from the casing will aerate the oil and lift the same up and out of the tubing 36.

If it is desired at any time to shut down the well or stop it from operating, the weight 64 is lifted and the spring 62 will elevate the valve ball 61, so as to close the fluid valve 54. As soon as all of the fluid has been expelled from the tubing, the gate valve 41 is closed and if a gate valve is provided in the gas pressure supply line 86, it may be closed. However, it is not necessary, as the regulator 87 will permit only a certain designated pressure to be built up in the casing 35. It is true that the pressure in the tubing and the casing will remain the same as long as the valve 41 is closed. The assembly may be inoperative for any length of time desired, because it is not possible for the gas pressure to escape, and therefore, a constant built-up pressure is maintained in the casing and the tubing. However, when it is desired to again operate the well, the valve 41 is opened and the weight 64 is lowered so as to open the fluid control valve 54. The bottom hole pressure will again lift the fluid above the aerating valve, and the gas now entering the aerating port will lift said fluid up and out of the tubing and the well is now producing as before.

It is preferable to locate the entire assembly of starting valves, aerating valves, fluid valve and packer below the standing liquid level of the well. In Figure 6, I have illustrated the various elements of the assembly as mounted at certain distances, and it is to be understood that these figures are merely for the purposes of illustration and the invention is not to be limited to them. It is pointed out that when the apparatus is used in different wells, different conditions are present and naturally the apparatus will have to be modified to fit each individual installation. However, it is essential in all cases that the aerating valve 72 which has the ports 78 therein, be below the standing fluid lever within the well.

The usual practice in lifting fluid by pressure has been to introduce pressure at the bottom of the well, and thereby raise the entire column of fluid in the tubing the full length of the well. There is a disadvantage to lifting fluid in this manner, as an enormous pressure is required to accomplish the same, and particularly to "kick off" or start the lifting of the fluid. As illustrated by the assembly shown in the drawings, the fluid is raised relatively a small amount at a time and consequently, the fluid can be raised with a much smaller pressure, which results in decreased operating costs.

In many instances, a well is operated only a limited period each day, and in such cases, it is desirable that the well "kick off" or flow immediately. With all of the present flowing devices, quite some time is required to obtain production after starting building up a gas pressure in the casing, because during the time the well is inactive, the fluid in the casing and the tubing have risen to the standing level within the well. This disadvantage is overcome by the invention shown in the drawings.

It is again pointed out that any suitable packer 45 may be employed, although the type shown in the drawings is preferred. The fluid valve 54, aerating valve 72 and starting valves 79 are all subject to variations, and several modified forms of the aerating valve are illustrated in the drawings. The depth at which the various elements of the assembly are located in the tubing string varies with each particular well in which the assembly is used, although it is preferable that the aerating valve 72 be below the standing fluid level in the well. Although the device has been described as utilizing gas pressure, it is obvious that air or other fluid pressure could be employed.

When the fluid comes out of the tubing it passes through the swage nipple 38, T 39 and into the pipe 40, which is connected to the pipes 14 and 15. It will be noticed in Figure 1 that these pipes 14 and 15 are connected to a manifold 18, which leads to the separator 12. In the separator the liquid is separated from the fluid and is led off through pipe 16 to stock tank 13. The gas outlet of the separator is connected to regulator 19 by pipe 17, in order that the regulator may hold a certain amount of back pressure on said outlet. The pipe 17 has a T 18 connected therein and pipe 22 connected to said T so as to lead a certain amount of gas from the separator to a scrubber 21, from which it is discharged into a compressor 24 through pipe 25. Due to the regulator 19 holding a back pressure on the pipes 17 and 22, the gas will be delivered to the low compression cylinder 23 at the same pressure as that held on the gas outlet 17 of the separator. The gas is then compressed and delivered to the high compression cylinder 26 where it is additionally compressed and then delivered to a manifold 27 through a pipe 28. From this manifold the gas is returned through pipe 30 to the well A and through pipe 31 to well B, where it connects to gas supply line 86 at each well. The outlet side of the regulator 19 is connected to a T 33 which in turn is connected to a similar regulator 32. A field line 34 is connected to the T 33 and may lead off to another installation, to storage facilities, or as desired. Thus, it will be seen that the regulator 32 will hold a certain back pressure on the line 34. The outlet side of the regulator 32 may be connected to a suitable stand-pipe, torch, or the like, if desired, so as to take care of any surplus gas discharged through said regulator.

Figure 18:
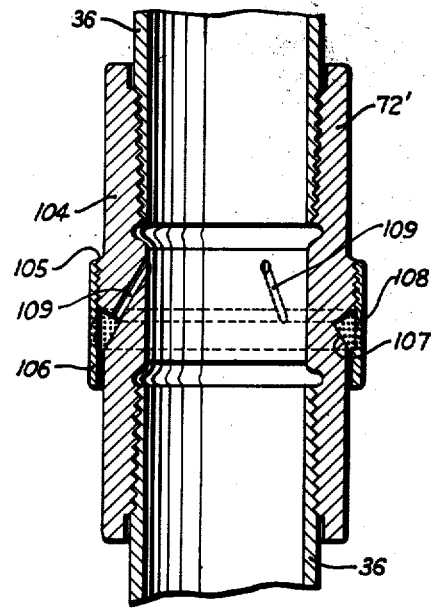
Figure 18 is an enlarged transverse vertical sectional view of another form of the aerating valve.

In Figure 18, another form of the aerating valve 72 is shown and this form comprises an elongated coupling collar 104, having internally screw threaded boxes at each end, so as to be connected into the tubing string 36. An annular, externally screw threaded boss 105 is provided intermediate the ends of the collar 104 and a band or ring 106, having a snug engagement with the collar is threaded on the boss. An annular, external channel 107 is provided on the collar 104 immediately below the screw threaded boss 105, and the ring 106 is provided with an annular, perforated section 108. This perforated section is positioned so as to provde admittance of gas pressure from the casing through said section 108 and into the channel 107. A plurality of upwardly inclined ports or ducts 109 connect the channel with the interior of the coupling collar 104. While it is preferable to use three of such ports 109, any number desired may be used. The operation of this form of the aerating valve and the results obtained are the same as the aerating valve 72.

Figures 22, 23:
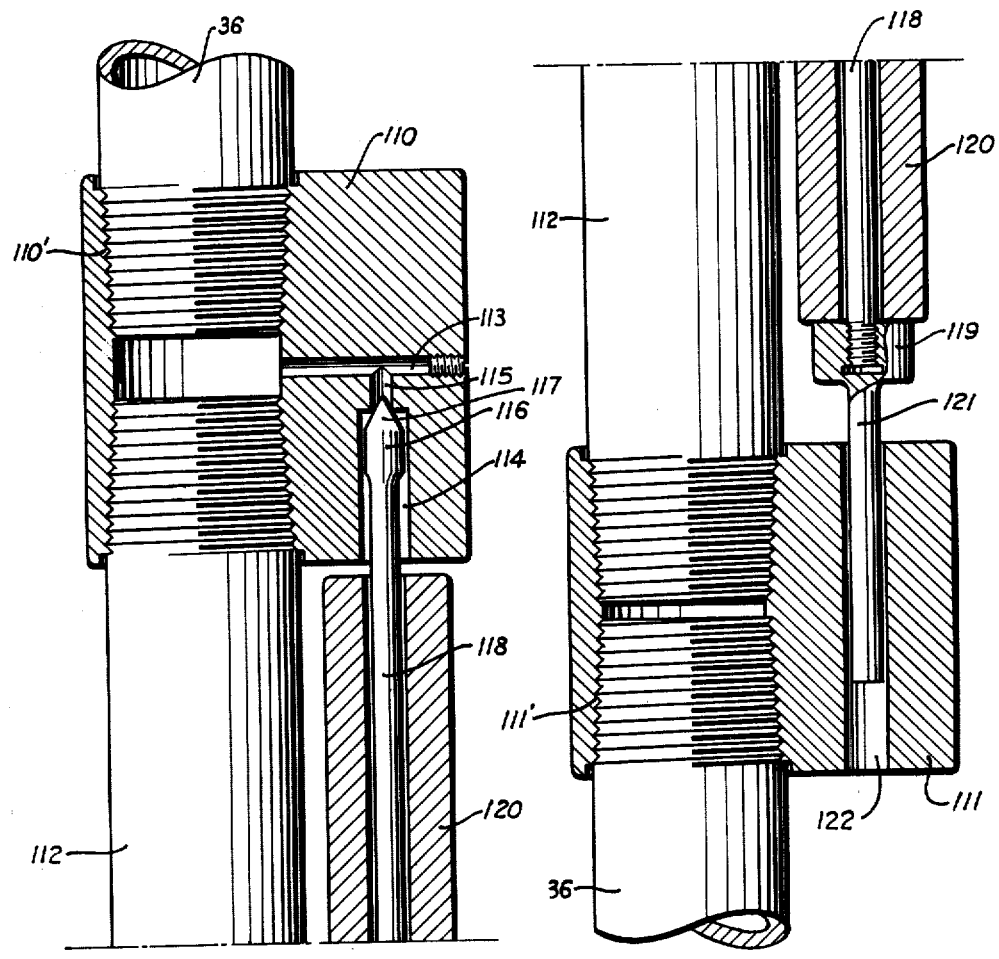
Figure 22 is an enlarged detail view of another form of aerating valve, partly in section and partly in elevation.
Figure 23 is a similar view of its lower portion of the same.

In Figures 22 and 23, I have shown another form of the aerating valve, which is particularly adapted for intermittent flowing of the well. In wells where the production of oil is very small or slow, or where it is only desired to remove a certain quantity from the well each day, the intermittent form of aerating valve is used. An elongated, upper coupling collar 110 and lower coupling collar 111 are connected in the tubing by means of the usual internally screw threaded boxes 110' and 111'. These two collars are connected together by a short length of tubing 112, so as to space said collars at the desired distance. The upper collar 110 is provided medially of its length with a horizontally extending duct or passage 113. A vertical, upwardly extending duct or passage 114 is drilled in the collar 110 and terminates short of the duct 113, but is connected thereto by a short, axial passage or port 115. The passage 114 forms a cylinder or housing for a cylindrical valve 116 having a conical point or seat 117. The cone of the valve fits within the axial port 115, so as to close the same when the valve is in its uppermost position. The valve is provided with a depending valve rod 118, which is screw threaded on its lower end, so as to engage in an upset box 119 on a guide rod 121. An elongated weight 120 loosely mounted on the rod 118 rests on the upset box. The lower portion of the guide rod 121 slides within a vertically extending passage 122 in the lower coupling member 111. The weight 120 may be of any desired number of pounds, as the number of pounds help control the operation of the valve 116.

In operating this form of the aerating valve, said valve is "kicked off" as described for the other forms of aerating valves and the gas pressure entering the passages 114, 115 and 113 will draw the valve 116 upwardly, so that the conical point 117 will enter the port 115 and close the same. The gas pressure will hold the valve closed. As the fluid builds up in the tubing above the duct 113, the weight of the fluid exerts a pressure on the valve 116 and when the fluid has risen sufficiently in the tubing 36 to overcome the pressure of the gas on the valve, said fluid will open said valve. When this occurs, the gas pressure will enter the tubing and aerate the column of fluid and lift the same up and out of the tubing. As soon as sufficient oil has been removed to reduce the weight on the valve to a predetermined amount, the gas pressure will again close the valve.

It will be seen in Figure 23 that when the valve opens it will only drop a short distance, as the upset box 119 will engage the upper face of the coupling member 111, and therefore the valve 116 will never drop down and out of the passage 114. It is pointed out that the weight 120 is variable, as a heavier or lighter weight may be readily placed on the valve rod 118. The heavier weight will make the valve open quicker so as to discharge the fluid more often and a lighter weight will require more oil pressure to open the valve 116, so as to discharge less frequently. Thus, it will be seen that by increasing or decreasing the weight 120, the opening and closing of said valve will be controlled.

The packer 45 is usually placed approximately at the producing level of the well, because ordinarily the aerating valve 72 is connected in the tubing string 36 a relative shoft distance above said packer. The producing level of a well is that level in the well where the well fluid may be removed the easiest and most conveniently. There are three pressures present in each well which have to be considered in installing the invention. These are: the necessary operating pressure, the greatest as it has to lift the well fluid up and out of the well; the bottom hole pressure, the next as it will only lift the fluid to the normal standing well fluid level of the well; and the pressure of the fluid, which is a combination of the operating pressure, the bottom hole pressure and the weight of the fluid after it has been aerated.

This application is filed as a substitute for my abandoned application, Serial No. 79,641.

What I claim and desire to secure by Letters Patent is:

1. A well flowing apparatus including, a tubing for conducting fluids up the well, a valve at the lower portion of the tubing controlling the admission of fluids from the sands to said tubing, means for introducing a lifting fluid into the tubing above said valve and below the liquid level therein, a weighted tool movable throughout the length of the tubing above said valve for engaging and opening the valve, a cable extending vertically in said tubing and suspending said tool, and means on the surface for running the cable and tool from the lower portion of said tubing to the top thereof.

2. A well flowing apparatus including, a tubing for conducting fluids from the well, a kick-off valve mounted in the tubing for admitting a lifting fluid and being normally closed, a fluid inlet valve at the lower portion of the tubing below the kick-off valve and normally closed, and a tool mounted to be lowered in the tubing for positively engaging and opening the kick-off valve and subsequently engaging and opening the inlet valve.

3. A well flowing apparatus including, a tubing for conducting fluids from the well, a kick-off valve mounted in the tubing for admitting a lifting fluid and being normally closed, a fluid inlet valve at the lower portion of the tubing below the kick-off valve and normally closed, a tool mounted to be lowered in the tubing for positively engaging and opening the kick-off valve and subsequently engaging and opening the inlet valve, and an aerating valve mounted in the tubing between the kick-off valve and the inlet valve.

4. A well flowing apparatus including, a tubing for conducting fluids from the well, a plurality of kick-off valves normally closed and disposed in the tubing at successive elevations below the level of the column of fluid standing in said tubing and normally closed, an aerating valve mounted in the tubing below the kick-off valve and normally open, a fluid inlet valve connected in the tubing below the aerating valve and normally closed, and a tool mounted to be lowered through the tubing for successively engaging the kick-off valves and positively opening each of the same and subsequently engaging and opening the fluid inlet valve.

5. A well flowing apparatus including, a tubing for conducting fluids from the well, a plurality of kick-off valves normally closed and disposed in the tubing at successive elevations below the level of the column of fluid standing in said tubing and normally closed, an aerating valve mounted in the tubing below the kick-off valve and normally open, a fluid inlet valve connected in the tubing below the aerating valve and normally closed, a tool mounted to be lowered through the tubing for successively engaging the kick-off valves and positively opening each of the same and subsequently engaging and opening the fluid inlet valve, and a packer mounted between the tubing and casing for packing off the space above said packer to confine the production fluids therebelow and to provide a lifting fluid reservoir thereabove.

6. A well flowing apparatus including, a tubing for conducting fluids from the well, a kick-off valve mounted in the tubing for admitting a lifting fluid and being normally closed, a fluid inlet valve at the lower portion of the tubing below the kick-off valve and normally closed, a tool mounted to be lowered in the tubing for positively engaging and opening the kick-off valve and subsequently engaging and opening the inlet valve, means for separating the lifting fluid from the fluids discharged from the tubing, means for repressuring the said lifting fluid, and means for delivering said repressured separated fluid to the kick-off valve and the aerating valve.

7. A well flowing apparatus including, a tubing for conducting fluids up the well, a kick-off valve mounted in the tubing and having an element projecting into the bore of said tubing, a fluid inlet valve at the bottom of the tubing for admitting fluid from its source of production, a tool arranged to travel down the well and having means for engaging the valve element to positively open the same when passing therethrough and for engaging the inlet valve and opening the same when lowered thereto, and a cable attached to said tool for rapidly running the same up and down the well.

8. A well flowing apparatus including, a tubing in the well for conducting fluids from the well, means for admitting a lifting fluid to the tubing from the well, means for admitting liquid from the sands to the tubing, and a movable actuating device suspended in the tubing and movable from the surface for sequentially operating said fluid admitting means and said liquid admitting means.

9. A well flowing assembly including, a well tubing within the well bore, a packer for packing off the tubing from said well to prevent flow through said well, means below the standing fluid level in the tubing for controlling the flow of well fluid through said tubing, a sleeve having radial ports therein connected in the tubing below the standing fluid level therein and above the packer, means for admitting fluid under pressure into said well and into said tubing through the ports of said sleeve, whereby said pressure fluid lifts the well fluid thereabove in said tubing to the surface, and means controlled from the surface of the well for operating the well fluid control means and pressure fluid admitting means.

10. A well flowing assembly including, a well tubing within the well bore, a series of flow valves normally closed mounted in the tubing at successive elevations below the level of the column of fluid standing in said tubing, an aerating valve mounted in said tubing below the flow valves and normally open, a fluid inlet valve connected in said tubing below the aerating valve and normally closed, a tool mounted to be lowered through said tubing for successively engaging the flow valves and positively opening each of the same and subsequently engaging and opening the fluid inlet valve, and a wire line connected to the tool for rapidly raising and lowering the same in said tubing.

11. A well flowing assembly including, a well tubing within the well bore, a plurality of valves having ports therein connected in said tubing below the standing fluid level therein, an aerating valve connected in said tubing below the valves, means for admitting fluid under pressure into said well above the standing well fluid level, and means controlled from the surface of the well for opening any one of the ports of said valves as desired and the remaining ports being closed, whereby said pressure fluid forces the well fluid from the standing level down in said well through the opened port of said valve and into said tubing and then said pressure fluid lifts said well fluid in said tubing above said opened valve to the surface, said pressure fluid forcing said well fluid in said well through the aerating valve after the level thereof has been lowered sufficiently by the successive opening of the ports of said valves.

12. A well flowing assembly including, a well tubing within the well bore, a plurality of valves having ports therein connected in said tubing below the standing fluid level therein, an aerating valve connected in said tubing below the valves, means for admitting fluid under pressure into said well above the standing well fluid level, means controlled from the surface of the well for opening any of the ports of said valves as desired, whereby said pressure fluid forces the well fluid from the standing level down in said well through the opened port of said valve and into said tubing and then said pressure fluid lifts said well fluid in said tubing above said opened valve to the surface, said pressure fluid forcing said well fluid in said well through the aerating valve after the level thereof has been lowered sufficiently by the successive opening of the ports of said valves, and a well fluid control valve connected in said tubing below the aerating valve and normally closed, said control valve adapted to be opened by said surface controlled opening means after said pressure fluid is flowing through said aerating valve.

13. A well flowing assembly including, a well tubing within the well bore, a plurality of valves having ports therein connected in said tubing below the standing fluid level therein, an aerating valve connected in said tubing below the valves, means for admitting fluid under pressure into said well above the standing well fluid level, means controlled from the surface of the well for opening any of the ports of said valves as desired, whereby said pressure fluid forces the well fluid from the standing level down in said well through the opened port of said valve and into said tubing and then said pressure fluid lifts said well fluid in said tubing above said opened valve to the surface, said pressure fluid forcing said well fluid in said well through the aerating valve after the level thereof has been lowered sufficiently by the successive opening of the ports of said valves, a well fluid control valve connected in said tubing below the aerating valve and normally closed, said control valve adapted to be opened by said surface controlled opening means after said pressure fluid is flowing through said aerating valve, and a packer connected in said tubing below said aerating valve to pack off said tubing from said casing, whereby said well fluid will only flow through said tubing and the downward travel of said pressure fluid is limited.

14. A well flowing assembly including, a well tubing within the well bore, a plurality of valves having ports therein connected in said tubing below the standing fluid level therein, means for admitting fluid under pressure into said well above the standing well fluid level, and means controlled from the surface of the well for opening any one of the ports of said valves as desired and the remaining ports being closed, whereby said pressure fluid forces the well fluid from the standing level down in said well through the opened port of said valve and into said tubing and then said pressure fluid lifts said well fluid in said tubing above said opened valve to the surface.

15. A well flowing assembly including, a tubing arranged to be mounted in the bore of the well, a single valve mounted in said tubing and having an actuating member exposed for operation, a fluid admitting valve mounted in said tubing and having an actuating element exposed for operation, and means arranged to be lowered into the well and having a member thereon arranged to engage and operate said actuating element to open said single valve and subsequently to operate said actuating element to open said fluid admitting valve.

16. A well flowing assembly including, a well tubing within a well bore, a flow valve normally closed mounted in the tubing below the level of the column of fluid standing in said tubing, an aerating valve mounted in said tubing below the flow valve and normally open, a fluid inlet valve connected in said tubing below the aerating valve and normally closed, a device mounted to be lowered in said well for successively engaging the flow valve and positively opening the same and subsequently engaging and opening the fluid inlet valve, and a wire line connected to the device for rapidly raising and lowering the same in said well.

17. A well flowing assembly including, a well tubing within a well bore, a series of flow valves normally closed mounted in the tubing at successive elevations below the level of column of fluid standing in said tubing, a fluid inlet valve connected in said tubing below the flow valves and normally closed, a device mounted to be lowered in said well for successively engaging the flow valves and positively opening each of the same and subsequently engaging and opening the fluid inlet valve, and a wire line connected to the device for rapidly raising and lowering the same in said well.

18. A well flowing assembly including, a well tubing within the well bore, a series of flow valves normally closed mounted in the tubing at successive elevations below the level of the column of fluid standing in said tubing, a device mounted to be lowered in the well bore for successively engaging the flow valves and positively opening each of the same, and a wire line connected to the device for rapidly raising and lowering the same in said well.

19. A well flowing assembly including, a tubing in a well having a column of liquid standing in the well, a plurality of means connected in the tubing for admitting a lifting fluid to the column of liquid in said tubing at successively lower elevations to start the flowing of said column of liquid, and means for positively and selectively engaging and opening said lifting fluid admitting means at successively lower elevation to admit lifting fluid to the tubing and for positively moving out of engagement to release said means to permit the lifting fluid to close the particular admitting means which has been opened.

20. The combination with a well tubing for flowing a well, of a plurality of normally closed pressure fluid inlet valves connected in said tubing at spaced elevations and arranged to be closed by the pressure fluid, a flexible means suspended in the tubing and controllable from the top of the well, and means on said first mentioned means arranged to successively and positively engage and open each valve when said flexible means is moved vertically in said tubing and to positively move out of engagement to release said valve when said means is moved out of actuating position, whereby the pressure fluid may close said valve.

JEDDY D. NIXON.

DISCLAIMER 2,132,081.—*Jeddy D. Nixon*, Houston, Tex. MEANS FOR THE FLOWING OF WELLS. Patent dated October 4, 1938. Disclaimer filed December 10, 1938, by the patentee and the assignee of one-half interest, *Wilson Supply Company*.

Hereby enter this disclaimer to the last four words in the last line of claim 6, to wit: "and the aerating valve."

[*Official Gazette January 10, 1939.*]

fluid forces the well fluid from the standing level down in said well through the opened port of said valve and into said tubing and then said pressure fluid lifts said well fluid in said tubing above said opened valve to the surface.

15. A well flowing assembly including, a tubing arranged to be mounted in the bore of the well, a single valve mounted in said tubing and having an actuating member exposed for operation, a fluid admitting valve mounted in said tubing and having an actuating element exposed for operation, and means arranged to be lowered into the well and having a member thereon arranged to engage and operate said actuating element to open said single valve and subsequently to operate said actuating element to open said fluid admitting valve.

16. A well flowing assembly including, a well tubing within a well bore, a flow valve normally closed mounted in the tubing below the level of the column of fluid standing in said tubing, an aerating valve mounted in said tubing below the flow valve and normally open, a fluid inlet valve connected in said tubing below the aerating valve and normally closed, a device mounted to be lowered in said well for successively engaging the flow valve and positively opening the same and subsequently engaging and opening the fluid inlet valve, and a wire line connected to the device for rapidly raising and lowering the same in said well.

17. A well flowing assembly including, a well tubing within a well bore, a series of flow valves normally closed mounted in the tubing at successive elevations below the level of column of fluid standing in said tubing, a fluid inlet valve connected in said tubing below the flow valves and normally closed, a device mounted to be lowered in said well for successively engaging the flow valves and positively opening each of the same and subsequently engaging and opening the fluid inlet valve, and a wire line connected to the device for rapidly raising and lowering the same in said well.

18. A well flowing assembly including, a well tubing within the well bore, a series of flow valves normally closed mounted in the tubing at successive elevations below the level of the column of fluid standing in said tubing, a device mounted to be lowered in the well bore for successively engaging the flow valves and positively opening each of the same, and a wire line connected to the device for rapidly raising and lowering the same in said well.

19. A well flowing assembly including, a tubing in a well having a column of liquid standing in the well, a plurality of means connected in the tubing for admitting a lifting fluid to the column of liquid in said tubing at successively lower elevations to start the flowing of said column of liquid, and means for positively and selectively engaging and opening said lifting fluid admitting means at successively lower elevation to admit lifting fluid to the tubing and for positively moving out of engagement to release said means to permit the lifting fluid to close the particular admitting means which has been opened.

20. The combination with a well tubing for flowing a well, of a plurality of normally closed pressure fluid inlet valves connected in said tubing at spaced elevations and arranged to be closed by the pressure fluid, a flexible means suspended in the tubing and controllable from the top of the well, and means on said first mentioned means arranged to successively and positively engage and open each valve when said flexible means is moved vertically in said tubing and to positively move out of engagement to release said valve when said means is moved out of actuating position, whereby the pressure fluid may close said valve.

JEDDY D. NIXON.

DISCLAIMER 2,132,081.—*Jeddy D. Nixon*, Houston, Tex. MEANS FOR THE FLOWING OF WELLS. Patent dated October 4, 1938. Disclaimer filed December 10, 1938, by the patentee and the assignee of one-half interest, *Wilson Supply Company*.

Hereby enter this disclaimer to the last four words in the last line of claim 6, to wit: "and the aerating valve."

[*Official Gazette January 10, 1939.*]